US006364207B1

(12) United States Patent
Thüringer et al.

(10) Patent No.: US 6,364,207 B1
(45) Date of Patent: Apr. 2, 2002

(54) DUAL-MODE DATA CARRIER AND CIRCUIT FOR SUCH A DATA CARRIER WITH POTENTIAL CUT-OFF FOR AT LEAST ONE CONTACT TERMINAL

(75) Inventors: Peter Thüringer; Wolfgang Eber; Dominik J. Berger, all of Graz (AT)

(73) Assignee: U.S. Philips Corp., New York, NY (US)

( * ) Notice: Subject to any disclaimer, the term of this patent is extended or adjusted under 35 U.S.C. 154(b) by 0 days.

(21) Appl. No.: 09/158,627

(22) Filed: Sep. 22, 1998

(30) Foreign Application Priority Data

Sep. 23, 1997 (EP) .............................................. 97890190

(51) Int. Cl.[7] .............................................. G06K 19/06
(52) U.S. Cl. ...................................... 235/492; 235/380
(58) Field of Search .................................. 235/492, 380

(56) References Cited

U.S. PATENT DOCUMENTS 5,929,414 A * 7/1999 Saitoh ........................ 235/380

FOREIGN PATENT DOCUMENTS

WO 9638814 A2 12/1996

* cited by examiner

Primary Examiner—Mark Tremblay
(74) Attorney, Agent, or Firm—Theodorus N. Mak

(57) ABSTRACT

A data carrier (1) which can be operated in a contact-bound mode and in a contactless mode and a circuit (1A) for such a data carrier (1) has supply voltage generating means (35), for deriving a supply voltage (VDD) for various circuit sections of the data carrier (1) and of the circuit (1A) from a received useful HF signal (HF), and additional switching means (91) by means of which the application of a potential (VDD), which appears as a result of the supply voltage generated by the supply voltage generating means (35), to at least one contact terminal (17A) can be inhibited.

12 Claims, 2 Drawing Sheets

| CLK1 | VCC | PRIOR-KBAI | KBAI |
|------|-----|------------|------|
| 0 | 0 | | |
| 1 | 1 | 0 v 1 | 1 |
| 0 | 1 | 1 | 1 |
| 0 v 1 | 0 | 0 v 1 | 0 |
| 0 | 1 | 0 | 0 |

FIG. 2

| HF | KLAI | KBAI | KLEI/KBEI | SAI/SEI | „91" | MODE |
|----|------|------|-----------|---------|------|------|
| 0 | 0 | 0 | | | | |
| 1 | 1 | 0 | 0 | 1 | OFF | CONTACTLESS |
| 1 | 1 | 0 | 0 | 1 | OFF | CONTACTLESS |
| 0 v 1 | 0 v 1 | 1 | 1 | 0 | ON | CONTACT |

FIG. 3

DUAL-MODE DATA CARRIER AND CIRCUIT FOR SUCH A DATA CARRIER WITH POTENTIAL CUT-OFF FOR AT LEAST ONE CONTACT TERMINAL

BACKGROUND OF THE INVENTION

The invention relates to a data carrier which can be operated in a contact-bound mode and in a contactless mode and which includes the means specified hereinafter, namely a transmission contact and a further transmission contact which are both mechanically accessible from outside the data carrier, and at least one transmission coil which is inductively accessible from outside the data carrier and which serves to receive a useful HF signal in the contactless mode of the data carrier, and a circuit which has a contact terminal connected to the one transmission contact and which has a further contact terminal connected to the further transmission contact and which includes supply voltage generating means to which a received useful HF signal can be applied and by which a supply voltage for various circuit sections of the circuit of the data carrier can be derived from an applied useful HF signal.

The invention further relates to a circuit for a data carrier which can be operated in a contact-bound mode and in a contactless mode and which includes the means specified hereinafter, namely a contact terminal and a further contact terminal which are both adapted to be connected to transmission contacts which are mechanically accessible from outside the data carrier, and two coil terminals which serve for connection to a transmission coil which is inductively accessible from outside a data carrier and which serves to receive a useful HF signal in the contactless mode of the circuit, and supply voltage generating means to which a received useful HF signal can be applied and by which a supply voltage for various circuit sections of the circuit can be derived from an applied useful HF signal.

Such a data carrier of the type defined in the first paragraph and such a circuit of the type defined in the second paragraph are known, for example from the document WO 96/38814 A1.

In the present context reference is made particularly to the known data carrier shown in FIG. 3 of the document WO 96/38814 A1 and described in the corresponding description. A problem encountered with this known data carrier, which as regards its contact-bound operation complies with the international standard ISO 7816, is that in the contactless mode of the data carrier, when a supply voltage is generated with the aid of the supply voltage generating means, a potential difference occurs between two transmission contacts on which the two supply potentials which define the supply voltage appear and which are not required for operation in the contactless mode. If in this situation an electrically conductive object, such as for example a coin or a ring on a finger of a user's hand, comes into electrically conductive contact with one of these two transmission contacts, a short-circuit occurs between these two transmission contacts, which causes the above-mentioned potential difference to break down, as a result of which the supply voltage generated with the aid of the supply voltage generating means is at least affected very strongly and may even totally break down. Eventually, this results in at least a disturbance or even a disruption of the contactless mode of operation, which is obviously undesirable and inadmissible.

SUMMARY OF THE INVENTION

It is an object of the invention to preclude the aforementioned problem and to provide an improved data carrier and an improved circuit for a data carrier in a simple manner and with the aid of minimal means.

According to the invention, in order to achieve the aforementioned object in a data carrier of the type defined in the first paragraph, the circuit includes switching means, and of the one contact terminal connected to the one transmission contact and the further contact terminal connected to the further transmission contact at least one of these two contact terminals is connected to the switching means, and the switching means enable the application of a potential, which appears as a result of the supply voltage generated by the supply voltage generating means, to this at least one contact terminal to be inhibited. Thus, it is achieved with only a minimal additional expenditure that with a data carrier in accordance with the invention it is always guaranteed that the in the contactless mode of the data carrier—in which a supply voltage is generated with the aid of the supply voltage generating means—the application of a supply potential to a respective transmission contact is inhibited, so that it is always assured that no short-circuit can occur between two supply potentials of different value, which further has the advantage that in the contactless mode of the data carrier this mode of operation cannot be disturbed or disrupted in an undesired manner.

In a data carrier in accordance with the invention having the characteristic features defined in the independent claim 1 it has proved to be advantageous if, in addition, the measures defined in the dependent claim 2 are taken. Such an embodiment is advantageous in view of a simple implementation of the circuit, particularly when the circuit is implemented in the form of an integrated circuit.

In a data carrier in accordance with the invention having the characteristic features defined in the independent claim 1 it has further proved to be advantageous if, in addition, the measures defined in the dependent claim 3 are taken. Such an embodiment has proved to be particularly advantageous in practical tests. It is to be noted that the measures defined in the dependent claim 3 can also be applied advantageously to a data carrier in accordance with the invention having the characteristic features defined in the dependent claim 2.

In a data carrier in accordance with the invention having the characteristic features defined in the independent claim 1 it has further proved to be particularly advantageous if, in addition, the measures defined in the dependent claim 4 are taken. Such an embodiment has proved advantageous in view of a particularly high reliability as regards the cut-off of an undesired potential from a transmission contact when a desired mode of operation of a dual-mode data carrier is active. It is to be noted that the measures defined in the dependent claim 4 can also be applied advantageously to data carriers in accordance with the invention having the characteristic features defined in the dependent claim 2 and 3.

In a data carrier in accordance with the invention having the characteristic features defined in the dependent claim 4 it has proved to be very advantageous if, in addition, the measures defined in the dependent claim 5 are taken. This has proved to be particularly advantageous in view of a very high reliability as regards the cut-off of an undesired potential from a transmission contact when the contact-bound mode is active.

According to the invention, in order to achieve the aforementioned object, a circuit of the type defined in the second paragraph is characterized in that the circuit includes switching means, and of the one contact terminal adapted to be connected to the one transmission contact and the further contact terminal adapted to be connected to the further transmission contact at least one of these two contact terminals is connected to the switching means, and the switching means enable the application of a potential, which appears as a result of the supply voltage generated by the supply voltage generating means, to this at least one contact terminal to be inhibited. In this way, advantages which correspond to the advantages described hereinbefore for a data carrier in accordance with the invention having the characteristic features defined in the independent claim 1 are obtained for a circuit in accordance with the invention.

The advantageous variants of a circuit in accordance with the invention, which variants have the characteristic features defined in the dependent claims 7 to 10, yield advantages which correspond to the advantages described above for the advantageous variants of a data carrier in accordance with the invention, which variants have the characteristic features defined in the dependent claim defined in the dependent claims 2 to 5.

The afore-mentioned aspects as well as further aspects of the invention will be apparent from the embodiments described hereinafter by way of examples and will be elucidated with reference to this embodiments.

BRIEF DESCRIPTION OF THE DRAWINGS

The invention will now be described in more detail with reference to two embodiments shown in the drawings and given by way of examples, but to which the invention is not limited.

FIG. 2 is a truth table for signals and information which can occur in the data carrier and the circuit shown in FIG. 1.

FIG. 3 is another truth table for signals and information which can occur in the data carrier and the circuit shown in FIG. 1.

DESCRIPTION OF THE PREFERRED EMBODIMENTS

Figure 1:
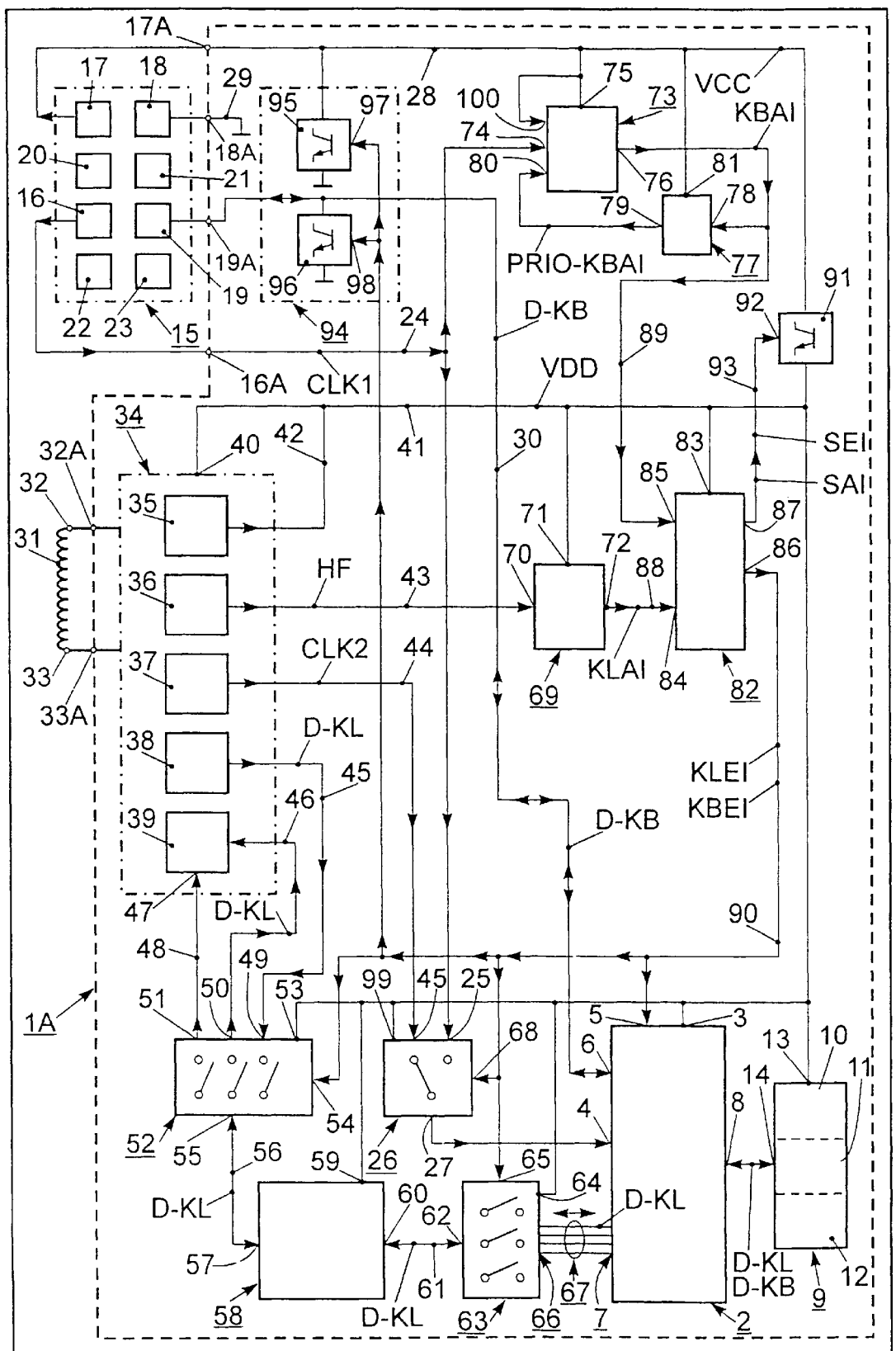
FIG. 1 is a diagrammatic representation in the form of a block diagram which shows the relevant part of a data carrier and a circuit for this data carrier in accordance with a first embodiment of the invention.

FIG. 1 is a diagrammatic representation in the form of a block diagram which shows a part of a data carrier 1 and a circuit 1A for the data carrier 1 in accordance with a first embodiment of the invention. In the present case the data carrier 1 is a so-called combi-card. The circuit 1A is an integrated circuit. The data carrier 1 and its circuit 1A can be operated in a so-called contact-bound mode and in a so-called contactless mode.

The data carrier 1, i.e. its circuit 1A, includes a microcomputer 2, which performs a plurality of functions and tasks. The microcomputer 2 serves inter alia for the processing of data which it receives or supplies. The microcomputer 2 has a potential terminal 3 for receiving a supply potential VDD or VCC, a clock signal terminal 4 for receiving a clock signal CLK1 or CLK2, a control terminal 5 for receiving mode-setting information KBEI or KLEI, a first data port 6 for serially receiving and serially supplying useful data D-KB when the contact-bound mode is active, a second data port 7, which comprises a plurality of terminals and which serves for the parallel reception and the parallel supply of useful data D-KL when the contactless mode is active, and a third data port 8 for supplying and for receiving useful data D-KB in the contact-bound mode as well as useful data D-KL in the contactless mode.

Connected to the third data port 8 of the microcomputer 2 are memory means 9 which include a RAM 10 forming the working memory, a ROM 11 forming the program memory, and an EEPROM 12 forming a program memory and data memory. The memory means 9 have a potential terminal 13 for receiving a supply potential VDD or VCC and a data port 14 for receiving and supplying useful data D-KB or D-KL. The data port 14 is connected to the third data port 8 of the microcomputer 2.

The data carrier 1 basically serves for processing useful data D-KB transmitted by a suitable transmitting/receiving device and received by the carrier in its contact-bound mode by means of the microcomputer 2 and subsequently storing this data in the memory means 9, or reading useful data D-KB from the memory means 9 by means of the microcomputer 2 and subsequently transferring this data to a suitable transmitting/receiving device which cooperates with the data carrier 1. Furthermore, the data carrier 1 serves for processing useful data D-KL supplied by a suitable transmitting/receiving device and inductively transmitted to the data carrier 1 in its contactless mode by means of the microcomputer 2 and for storing this data in the memory means 9, or reading useful data D-KL from the memory means 9 by means of the microcomputer 2 and subsequently processing this data and transmitting the data inductively to a suitable transmitting/receiving device.

The data carrier 1 has a contact array 15 which in the present case comprises a eight transmission contacts 16, 17, 18, 19, 20, 21, 22 and 23 in total. In the present case these eight transmission contacts 16 to 23 are formed by contact pads whose flat shapes are shown only diagrammatically in FIG. 1. The transmission contacts 16 to 23 formed by contact pads are mechanically accessible from outside the data carrier 1. In other words, this means that these transmission contacts 16 to 23 are engageable with mating contacts of a suitable transmitting/receiving device when the data carrier 1 is introduced into this transmitting/receiving device.

The contact array 15 has a first transmission contact 16 which serves for receiving a clock signal CLK1 in the contact-bound mode of the data carrier 1. The contact array 15 further has a second transmission contact 17 which serves for receiving a first supply potential VCC in the contact-bound mode. The contact array 15 further has a third transmission contact 18 which serves for receiving a second supply potential in the contact-bound mode, which supply potential in the present case is ground potential, as is indicated in FIG. 1. The contact array 15 further has a fourth transmission contact 19 which serves for transferring useful data D-KB, i.e. via which the useful data D-KB supplied by a suitable transmitting/receiving device can be supplied to the data carrier 1 and via which useful data D-KB supplied by the data carrier 1 can be applied to a transmitting/receiving device. The contact array 15 further has a fifth transmission contact 20 which serves for receiving a reset signal (RST). Since the use and effect of such a reset signal is not relevant in the present context this is not discussed any further with reference to FIG. 1. The contact array 15 further has a sixth transmission contact 21, a seventh transmission contact 22 and an eighth transmission contact 23. These three transmission contacts 21, 22 and 23 are free, i.e. not used, in the present data carrier 1.

The first transmission contact 16 is connected to a first contact terminal 16A of the circuit 1A, which terminal is connected to an electrically conductive clock signal line 24, via which a clock signal CLK1, supplied via the first transmission contact 16 and the first contact terminal 16A, can be applied to a first input terminal 25 of controllable clock signal switching means 26. The clock signal switching means 26 have a potential terminal 99 for receiving a supply potential VDD or VCC and an output 27, which output is connected to the clock signal terminal 4 of the microcomputer 2 and via which the clock signal CLK1 and a further clock signal CLK2 can be applied to the microcomputer 2. In order to be controlled, the controllable clock signal switching means 26 have a control input 68, to which mode-setting information KBEI or KLEI can be applied.

The second transmission contact 17 is connected to a second contact terminal 17A of the circuit 1A, which terminal is connected to a first electrically conductive potential line 28, via which the first supply potential VCC can be applied to various circuit sections of the data carrier 1, i.e. of the circuit 1A of the data carrier 1, as will be described hereinafter.

The third transmission contact 18 is connected to a third contact terminal 18A of the circuit 1A, which terminal is connected to a second electrically conductive potential line 29, via which the ground potential can be applied to various circuit sections of the data carrier 1, i.e. of the circuit 1A of the data carrier 1, which is not shown in FIG. 1 for the sake of the clarity of the drawing.

The fourth transmission contact 19 is connected to a fourth contact terminal 19A of the circuit 1A, which terminal is connected to an electrically conductive data line 30, via which the fourth contact terminal 19A is connected to the first data port 6 of the microcomputer 2, as a result of which useful data D-KB can be transferred between the fourth transmission contact 19 and the first data port 6 of the microcomputer 2 via this data line 30 when the data carrier 1, i.e. the circuit 1A, is active in the contact-bound mode.

As regards the transmission contacts 16 to 23 of the contact array 15 it is to be noted that as a result of a supply potential VDD generated in the circuit 1A of the data carrier 1 in the contactless mode of the data carrier 1, i.e. of the circuit 1A, a potential can appear on at least one transmission contact and one further transmission contact, which potential is produced via internal circuit sections, such as for example driver stages for energizing the transmission contacts and which can be influenced from outside the data carrier 1. A d.c. potential of a given potential value, i.e. the potential value of the supply potential VDD, can also appear on the fourth transmission contact 19. Without special arrangements and measures the data carrier 1 would have the problem that different potential values could appear on various contacts, as a result of which touching of the various contacts, for example the two transmission contacts 17 and 18 or the two transmission contacts 19 and 18, with a coin or any other electrically conductive object would lead to a short-circuit of the different potential values, which is not desirable. For this reason, the data carrier 1 shown in FIG. 1 has been provided with additional means in order to preclude the afore-mentioned problem, which will be described in more detail hereinafter.

The data carrier 1 further has a transmission coil 31 incorporated in the data carrier 1, which coil is inductively accessible from outside the data carrier 1 and serves for receiving a useful HF signal HF from a suitable transmitting/ receiving device in the contactless mode of the data carrier 1. Such a useful HF signal HF can be received by the data carrier 1 when the data carrier 1 is within the range of such a transmitting/receiving device. In addition to the contact-bound mode communication possibility via the contact array 15 the transmission coil 15 also provides the possibility of communication between the data carrier 1 and a suitable transmitting/receiving device by an inductive method.

The transmission coil 31 of the data carrier 1 has two coil ends 32 and 3. The two coil ends 32 and 33 are connected to two coil terminals 32A and 33A of the circuit 1A of the data carrier 1, which coil terminals are connected to processing means 34 shown in dash-dot lines in FIG. 1.

The processing means 34 comprise rectifier means 35 as supply voltage generating means, transfer means 36, clock signal regenerating means 37, demodulator means 38 and modulator means 39. In a manner not shown, the afore-mentioned means 35 to 39 are connected to the coil terminals 32A and 33A and, consequently, to the transmission coil 31 via the coil ends 32 and 33. The processing means 34 have a potential terminal 40 to which a supply potential VCC or VDD can be applied. A supply potential VCC or VDD applied to the potential terminal 40 can be supplied to the means 35 to 39 in a manner not shown. The potential terminal 40 is connected to a second electrically conductive potential line 41.

The rectifier means 35 serve for rectifying a useful HF signal HF received from the transmission coil 31. When the rectifier means 35 receive such a useful HF signal HF the rectifier means 35 generate a supply voltage and thus a second supply potential VDD, which is applied to the second electrically conductive potential line 41 via an electrically conductive line 42.

The transfer means 36 serve for transferring an useful HF signal HF received by the transmission coil 31 and applied to the transfer means 36. The transfer means 36 supply a useful HF signal HF applied to them to a further electrically conductive line 43.

The clock signal regenerating means 37 serve for regenerating a clock signal CLK2, which the clock signal regenerating means 37 derive from a useful HF signal HF received by means of the transmission coil 31 and applied to the clock signal regenerating means 37. The clock signal regenerating means 37 supply a clock signal CLK2 regenerated by said means to a further electrically conductive line 44, which leads to a second input terminal 45 of the clock signal switching means 26, thus enabling a regenerated clock signal CLK2 to be applied to the clock signal terminal 4 of the microcomputer 2 via the clock signal switching means 26.

The demodulator means 38 serve for and are constructed for demodulating a useful HF signal HF received by means of the transmission coil 31 and applied from this coil to the demodulator means 38, which demodulator means 38 enable useful data D-KL conveyed by a received useful HF signal HF as a modulation to be derived from the received useful HF signal HF. The demodulator means 38 supply the useful data D-KL which they have derived to a further electrically conductive line 45.

The modulator means 39 serve to modulate useful data D-KL, which can be applied to the modulator means 39 via a further electrically conductive line 46 and which, after they have been modulated, can be applied from the modulator means 39 to the transmission coil 31 in order to be transmitted to s suitable transmitting/receiving device constructed for inductive transmission. The modulator means 39 have a control input 47 connected to a further electrically conductive line 48 via which an enable signal can be applied to the modulator means 39.

The electrically conductive lines 45, 46 and 48 are connected to terminals 49, 50 and 51 of first controllable decoupling means 52. The first controllable decoupling means 52 have a potential terminal 53, via which a supply potential VCC or VDD can be applied to the first controllable decoupling means 52. The first controllable decoupling means 52 further have a control input 54 via which mode-setting information KBEI or KLEI can be applied to the first controllable decoupling means 52. The first controllable decoupling means further have a serial data port 55 connected to a first serial data port 57 of data processing means 58 via a first bidirectional serial data line 56.

The data processing means 58 comprise a hard-wired circuit device by means of which useful data D-KL received by the data carrier 1 can be processed before being applied to the microcomputer 2 and by means of which useful data D-KL supplied by the microcomputer 2 can be processed before being transmitted by the transmission coil 31. The data processing means 58 have a potential terminal 59, to which a supply potential VCC or VDD can be applied. The data processing means 58 further have a second serial data port 60 connected to a serial data port 62 of second controllable decoupling means 63 via a second serial data line 61.

The second controllable decoupling means 63 have a potential terminal 64 via which a supply potential VCC or VDD can be applied to the second controllable decoupling means 63. The second controllable decoupling means 63 further have a control input 65 via which mode-setting information KBEI or KLEI can be applied to the second controllable decoupling means 63. The second controllable decoupling means 63 further have a parallel data port 66 comprising a plurality of separate terminals and connected to the second data port 7 of the microcomputer 2 via a parallel data bus 67. The parallel data bus 67 enables a transmission of useful data D-KL in parallel form between the second controllable decoupling means 63 and the microcomputer 2.

The first controllable decoupling means 52 serve to decouple, on the one hand, the demodulator means 38 and the modulator means and, on the other hand, the data processing means 58 and the second controllable decoupling means 63 serve to decouple, on the one hand, the data processing means 58 and, on the other hand, the microcomputer 2. The controllable decoupling means 52 and 53 are controllable via the control inputs 54 and 65 in such a manner that the controllable decoupling means 52 and 63 can each be switched between a decoupling state and a coupling state. When the controllable decoupling means 52 and 63 are each in the coupling state a data transfer of useful data D-KL from the transmission coil 31 to the microcomputer 2 and finally from the latter to the memory means 9 is possible via the demodulator means 38, the first decoupling means 52, the data processing means 58 and the second decoupling means 63 and, in the opposite direction, a data transfer of useful data D-KL is possible from the memory means 9 to the transmission coil 31 via the microcomputer 2, the second decoupling means 63, the data processing means 58, the first decoupling means 52 and the modulator means 39.

The data carrier 1, i.e. its circuit 1A, includes a.c. detection means 69 having an input terminal 70 connected to the electrically conductive line 43, which thus provides an electrically conductive connection between the transfer means 36 and the a.c. detection means 69. The a.c. detection means 69 have a potential terminal 71 via which a supply potential VCC or VDD can be applied to the a.c. detection means 69. The a.c. detection means 69 are constructed to detect the presence of a received useful HF signal HF. Upon detection of the presence of such a useful HF signal HF in a detection process the a.c. detection means 69 can initiate the supply of contactless activation information KLAI. By means of such contactless activation information KLAI the contactless mode of the data carrier 1, i.e. its circuit 1A, can be activated. It is to be noted that the a.c. detection means 69 effect a detection of the presence of a received useful HF signal HF both when they are energized with the first supply potential VCC and when they are energized with the second supply potential VDD, which in other words means that the a.c. detection means are not capable of making a distinction between the first supply potential VCC and the second supply potential VDD, i.e. are not capable of identifying or detecting at least one of the two supply potentials VCC and VDD.

The data carrier 1 and its circuit 1A now advantageously also include combination detection means 73.

In the present case the combination detection means 73 constitute first clock signal detection means connected to the first contact terminal 16A of the circuit 1A and thus to the first transmission contact 16 of the data carrier 1 via the electrically conductive line 24, which electrically conductive line 24 leads to a first input terminal 74 of the combination detection means 73. The combination detection means 73, i.e. their part forming clock signal detection means, are constructed to detect the presence of a clock signal CLK1 received via. the first transmission contact 16 and the first contact terminal 16A and, upon detection of the presence of such a clock signal CLK1 in a detection process, the combination detection means 73 can initiate the supply of contact-bound activation information KBAI by means of which the contact-bound mode can be activated.

The combination detection means 73 further form supply potential detection means which are connected to the second contact terminal 17A of the circuit 1A and to the second transmission contact 17 of the data carrier 1 via the first electrically conductive potential line 28. As is apparent from FIG. 1, the combination detection means 73 have a potential terminal 75 connected to the second contact terminal 17A and the second transmission contact 17 via the first electrically conductive potential line 28, thus enabling the first supply potential VCC to be applied to the combination detection means 73 to provide the power supply for said means. The combination detection means 73 further have a potential input terminal 100, which constitutes an identification or detection input and which is also connected to the potential line 28, thus enabling the first supply potential VCC to be applied to the combination detection means 73 for identification or detection purposes. The combination detection means 73, i.e. the part forming the supply potential detection means, are constructed to detect the presence of a received first supply potential VCC and upon detection of the presence of such a first supply potential VCC in a detection process the combination detection means 73 can initiate the supply of contact-bound activation information.

In the present case of the data carrier 1 and its circuit 1A shown in FIG. 1 the combination detection means 73 are constructed in such a manner that in a detection process the supply of contact-bound activation information KBAI can be initiated only in the case of simultaneous detection of the presence of a clock signal CLK1 and the presence of a first supply potential VCC. Such contact-bound activation information KBAI can be supplied to an output 76 of the combination detection means 73.

In the data carrier 1 of FIG. 1 the combination detection means 73 cooperate with memory means 77 which, in the present case, are formed in a particularly advantageous manner by a so-called latch. The memory means 77 have an input 78 connected to the output 76 of the combination detection means 73. The memory means 77 have an output 79 connected to a second input terminal 80 of the combination detection means 73. Contact-bound activation information KBAI supplied by the combination detection means 73 during a detection process can be stored by the memory means 77, which is effected in order to achieve that during a detection process prior contact-bound activation information PRIOR-KBAI supplied by the combination detection means 73 and stored in the memory means 77 in a previous detection process is available. The memory means 77 have a potential terminal 81 via which the first supply potential VCC can be applied to the memory means 77.

In the data carrier 1 and its circuit 1A as shown in FIG. 1 the combination detection means 73 are, in addition, also adapted to detect the presence of prior contact-bound activation information PRIOR-KBAI supplied in a previous detection process and stored in the memory means 77, which information can be applied to the combination detection means 73 via the second input terminal 80. During a detection process—in which dropping out of a received clock signal CLK1 but the subsequent presence of the first supply potential VCC and the presence of prior contact-bound activation information PRIOR-KBAI are detected—the combination detection means 73 maintain the supply of contact-bound activation information KBAI.

The data carrier 1 and its circuit 1A further include logic means 82. The logic means 82 have a potential terminal 83 via which a supply potential VCC or VDD can be applied to the logic means 82 from the second electrically conductive potential line 41. The logic means 82 further have a first input terminal 84, a second input terminal 85, a first output terminal 86 and a second output terminal 87. The first input terminal 84 of the logic means 82 is connected to the output 72 of the a.c. detection means 69 via a further electrically conductive line 88, thus enabling contactless mode activation information KLAI to be applied to the logic means 82. The second input terminal 85 is connected to the output 76 of the combination detection means 73 via a further electrically conductive line 89, thus enabling contact-bound mode activation information KBAI to be applied to the logic means 82.

The logic means 82 are of such a construction that if solely contactless mode activation information KLAI occurs they supply contact less mode-setting information KLEI associated with said activation information, that if solely contact-bound activation information KBAI occurs they supply contact-bound mode-setting information KBEI associated with said activation information, and that if at the same time both types of activation information KLAI and KBAI occur they give the contact-bound activation information KBAI priority over the contactless activation information KLAI and they consequently supply the associated contact-bound mode-setting information KBEI. The contactless mode-setting information KLEI and the contact-bound mode-setting information KBEI is supplied via the first output terminal 86 of the logic means 82. The first output terminal 86 of the logic means 82 is connected to a further electrically conductive line 90 via which the contactless mode-setting information KLEI and the contact-bound mode-setting information KBEI can be applied as control information to the various circuit sections of the data carrier 1 and the circuit 1A. It is to be born in mind that by means of the contact-bound mode-setting information KBEI the contact-bound mode of the data carrier 1 and by means of the contactless mode-setting information KLEI the contactless mode of the data carrier 1 and the circuit 1A can be selected.

In the data carrier 1 the second transmission contact 17 and the second contact terminal 17A of the circuit 1A, which terminal is connected to said transmission contact, is connected to controllable switching means 91, associated with this second transmission contact 17 and the second contact terminal 17A, which switching means enable the application of a second supply potential VDD, which is available in the data carrier 1 and in the circuit 1A as a result of the supply voltage generated by the supply voltage generating means, i.e. the rectifier means 35, to the second transmission contact 17 and to the second contact terminal 17A to be inhibited. In the present case the controllable switching means 91 are formed by a transistor switch arranged in series with the second transmission contact 17 and with the second contact terminal 17A and which can be switched between a high-impedance and a low-impedance switching state. In order to enable this switching process to be carried out the controllable switching means 91 have a control input 92 connected to the second output terminal 87 of the logic means 82 via a further electrically conductive line 93.

As already explained hereinbefore, contactless activation information KLAI, by means of which the contactless mode can be activated, can be applied to the logic means 82 via the first input terminal 84 of said means. Contact-bound activation information KBAI, by means of which the contact-bound mode can be activated, can be applied to the logic means 82 via the second input terminal 85.

The logic means 82 are of such a construction that they can also supply switching-means control information and that when solely the contactless activation information KLAI associated with said control information occurs they supply switching-means opening information SAI as switching-means control information, when solely the contact-bound activation information KBAI occurs they supply switching-means closing information SEI associated with said control information as switching-means control information, and when both types of activation information KLAI and KBAI occur simultaneously they give the contact-bound activation information KBAI priority over the contactless activation information KLAI and, consequently, also supply the associated switching-means closing information SEI as switching-means control information. The switching-means opening information SAI and the switching-means closing information SEI is applied to the control input 92 of the switching means 91 via the electrically conductive line 93, the switching-means opening information SAI enabling the switching means 91 to be set to the switching state which inhibits the application of a supply potential VDD to the second transmission contact 17 and the second contact terminal 17A, and the switching-means closing information SEI enabling the switching means 91 to be set to the switching state in which the application of a supply potential VDD to the second transmission contact 17 and the second contact terminal 17A. In the switching state of the switching means 91 which enables a supply potential VDD to be applied to the second contact terminal 17A and the second transmission contact 17 it is achieved advantageously that a first supply potential VCC received from the second transmission contact 17 can be applied to the second electrically conductive potential line 41 via the first electrically conductive potential line 28 and the switching means 91, as a result of which the circuit sections of the data carrier 1 and its circuit 1A which are energized via the second electrically conductive potential line 41 are energized with the first supply potential VCC.

The data carrier 1 and the circuit 1A shown in FIG. 1 further includes potential equalizing means 94. By means of these potential equalizing means 94 the second transmission contact 17, and consequently the contact terminal 17A, and the fourth transmission contact 19, and consequently the fourth contact terminal 19A, can be brought at substantially the same potential, in the present case at the ground potential which also appears on the third transmission contact 18 and the third contact terminal 18A, when a sufficiently powerful useful HF signal HF is received, from which a supply voltage and, consequently, the second supply potential VDD, can be derived by the supply voltage generating means, i.e. the rectifier means 35, which is specifically so when the data carrier 1 and the circuit 1A are in the contactless mode.

In the present case, the potential equalizing means 94 are essentially formed by two controllable transistor switches 95 and 96, which each have a control input 97 and 98, respectively. Each of the two control inputs 97 and 98 is connected to the electrically conductive line 90, to which the logic means supply the contactless mode-setting information KLEI and the contact-bound mode-setting information KBEI.

In a variant of the data carrier of FIG. 1, which is not shown separately, all the eight contacts 16 to 23 of the contact array 15 can be brought at the same potential, which can again be ground potential but also another potential, such as the second supply potential VDD, with the aid of potential equalizing means 94 which comprise eight controllable transistor switches in total.

Hereinafter, the operation of the data carrier 1 and its circuit 1A as regards the activation of the contact-bound mode and the activation of the contactless mode will be described, reference being made to the two truth tables of FIGS. 2 and 3. The truth table of FIG. 2 relates to the combination detection means 73. The truth table of FIG. 3 relates to the a,c, detection means 69 and to the logic means 82.

The first column of the truth table of FIG. 2 indicates the presence (1) or absence (0) of the clock signal CLK1 on the first input terminal 74 of the combination detection means 73. The second column of this truth table indicates the presence (1) or absence (0) of the first supply potential VCC on the potential terminal 75 of the combination detection means 73. The third column of this truth table indicates the presence (1) or absence (0) of prior contact-bound activation information PRIOR-KBAI on the second input terminal 80 of the combination detection means 73. Finally, the fourth column of this truth table indicates the presence (1) or absence (0) of contact-bound activation KBAI on the output 76 of the combination detection means 73.

The first column of the truth table of FIG. 3 indicates the presence (1) or absence (0) of a useful HF signal HF on the input terminal 70 of the a.c. detection means 69. The second column of this truth table indicates the presence (1) or absence (0) of contactless activation information KLAI on the output 72 of the a.c.detection means 69 and on the first input terminal 84 of the logic means 82. The third column of this truth table indicates the presence (1) or absence (0) of contact-bound activation information KBAI on the output 76 of the combination detection means 73 and on the second input terminal 85 of the logic means 82. The fourth column of the truth table of FIG. 3 indicates the presence of contactless mode-setting information KLEI=0 and the presence of contact-bound mode-setting information KBEI=0 on the first output terminal 86 of the logic means 82. The fifth column of this truth table indicates the presence of switching-means opening information SEI=0 on the second output terminal 87 of the logic means 82. The sixth column of this truth table gives the switching states of the switching means 91, "ON" being the low-impedance state and "OFF" being the high-impedance state. The seventh column of the truth table of FIG. 3 specifies the modes (MODE) of the data carrier 1 and its circuit 1A, "CONTACTLESS" indicating the contactless mode and "CONTACT" indicating the contact-bound mode.

It is assumed that neither the contact array 15 nor the transmission coil 31 of the data carrier 1 are in communication with a suitable transmitting/receiving device. In this situation—see the first rows of the two truth tables in FIGS. 2 and 3—neither a clock signal CLK1 nor a first supply potential VCC nor a useful HF signal HF appear in the data carrier 1 and its circuit 1A. As a result of the absence of the first supply potential VCC the combination detection means 73 and the memory means 77 are not energized, so that said means do not supply any information. Owing to the absence of a useful HF signal HF the rectifier means 35 do not supply a second supply potential VDD, as a result of which the a.c. detection means 69 and the logic means 62 are neither energized and consequently do not supply any information.

In accordance with the second row in FIG. 2, it is assumed that by means of its contact array 15 the data carrier 1 is subsequently brought into communication with a suitable transmitting/receiving device provided for this purpose, in which situation a clock signal CLK1 is transmitted to the data carrier 1 via the first transmission contact 16, the first supply potential VCC is transmitted via the second transmission contact 17, and ground potential is transmitted via the third transmission contact 18. Consequently, the combination detection means 73 detect the presence (1) of the clock signal CLK1 and the presence (1) of the first supply potential VCC, which results in the occurrence (1) of the contact-bound activation information KBAI on the output 76 of the combination detection means 73, which is independent of the fact whether prior contact-bound activation information PRIOR-KBAI is present (1) or not present (0).

In accordance with the third row in FIG. 2, it is assumed that subsequently—i.e. after a generation (1) of contact-bound activation information KBAI in accordance with the second row—the supply of the clock signal CLK1 to the first transmission contact 16 and, consequently, to the data carrier 1 is interrupted—as is effected intentionally in the case of a correct communication in the contact-bound mode—but that the supply (1) of the first supply potential VCC is sustained. In this situation, the combination detection means 73 detect the absence (0) of the clock signal CLK1 but they also detect the presence (1) of the first supply potential VCC as well as the presence (1) of prior contact-bound activation information PRIOR-KBAI, as a result of which the combination detection means 73 maintain the transfer of the contact-bound activation information KBAI.

In accordance with the fourth row in FIG. 2, it is now assumed that subsequently—regardless of whether the combination detection means 73 have detected the presence (1) or absence (0) of the clock signal CLK1—the combination detection means 73 detect the absence (0) of the first supply potential VCC, i.e. the supply of the first supply potential VCC has ceased. In this case the combination detection means 73—regardless of whether the presence (1) or absence (0) of prior contact-bound activation information PRIOR-KBAI on their second input terminal 80 is detected—respond by causing a termination (0) of the supply of contact-bound activation information KBAI.

Finally, the situation indicated in the fifth row in FIG. 2 is described, in which it is assumed that the combination detection means 73 detect the absence (0) of prior contact-bound activation information PRIOR-KBAI, which means that previously the contact-bound mode was not active. If in such a situation the combination detection means 73 detect solely the presence (1) of the first supply potential VCC but at the same time the absence (0) of the clock signal CLK1, this results in contact-bound activation information KBAI not (0) being available on the output 76 of the combination detection means 73. This means that the contact-bound mode cannot be activated by a spurious voltage which appears, for example as a result of inadvertent touching, on the second transmission contact 17, which serves for the application of the first supply potential VCC, which is particularly advantageous because it guarantees that the contactless mode which is for example active in this situation is not interrupted by an inadvertent activation of the contact-bound mode.

The description of the operation will now be continued with reference to FIG. 3. The first row of FIG. 3 represents the previously described initial situation of the data carrier 1, in which the data carrier 1 neither the contact array 15 nor the transmission coil 31 of the data carrier 1 are in communication with a suitable transmitting/receiving device.

In accordance with the second row in FIG. 3 it is now assumed that the data carrier 1 comes within the transmitting/receiving range of a transmitting/receiving device which can inductively communicate with the data carrier 1. In this case a useful HF signal HF is received via the transmission coil 31. The useful HF signal HF is applied to the rectifier means 35, as a result of which the rectifier means 35 start to build up a supply voltage and thus the second supply potential VDD. The useful HF signal HF is further applied to the input terminal 70 of the a.c. detection means 69, which is adapted to detect the presence (1) of a useful HF signal HF in a reliable manner even while the second supply potential VDD is still building up. The detection (1) of a useful HF signal HF results in the a.c. detection means 69 supplying contactless activation information KLAI to their output 72, which information is applied to the first input terminal 84 of the logic means 82. At the same time, the absence (0) of contact-bound activation information KBAI on the second input terminal 85 of the logic means 82 is detected as a result of the absence (0) of a clock signal CLK1 and the absence (0) of the first supply potential VCC. The logic means 82 are of such a construction that in this operating condition they first generate switching-means opening information SAI=1 and, a given time interval after this, contactless mode-setting information KLEI=0. Thus, it is achieved that the switching means 91 are set to their high-impedance switching state with the aid of the switching-means opening information SAI=1 via the electrically conductive line 93 and the control input 92, and that subsequently the data carrier 1 and its circuit 1A are set to the contactless mode with the aid of the contactless mode-setting information KLEI=0 via the electrically conductive line 90, the contactless mode-setting information KLEI=0 being transferred, via the electrically conductive line 90, to the control terminal 5 of the microcomputer 2, to the control input 65 of the second decoupling means 63, to the control input 68 of the clock-signal switching means 26, to the control input 54 of the first decoupling means 52, and to the two control inputs 97 and 98 of the transistor switches 95 and 96 of the potential equalizing means 94. In this way, the microcomputer 2, the clock-signal switching means 26, the two decoupling means 52 and 53, as well as the potential equalizing means 94 are set to their operating conditions which correspond to the contactless mode.

In accordance with the third row in FIG. 3, it is assumed that—after the data carrier 1 has inductively entered into communication with a transmitting/receiving device—this communication between the data carrier 1 and the transmitting/receiving device is maintained. Subsequently, a useful HF signal HF is received in this situation, whose presence (1) is detected by the a.c. detection means 69, as result of which these means cause the transfer (1) of the contactless activation information KLAI from their output 72 to the first input terminal 84 of the logic means 82. As long as the logic means 82 detect the absence (0) of contact-bound activation information KBAI on their second input terminal 85, the logic means 82 subsequently produce the contactless mode-setting information KLEI=0 on their first output terminal 86 and the switching-means opening information SAI=1 on their second output terminal 87. As a consequence, the switching means 91 remain in their high-impedance state and the data carrier 1 is set to the contactless mode (CONTACTLESS).

In accordance with the fourth row in FIG. 3, it is assumed that the data carrier 1 communicates with a suitable transmitting/receiving device by means of its contact array 15, as a result of which the combination detection means 73 produce contact-bound activation information KBAI on their output 76 and, consequently, the logic means 82 detect the presence (1) of the contact-bound activation information KBAI on the second input terminal 85 of the logic means 82. In this situation the logic means 82 respond in such a manner—regardless of whether the presence (1) or absence (0) of contactless activation information KLAI on the first input terminal 84 of the logic means 82 is detected—that the logic means 82 in all cases give the contact-bound activation information KBAI priority over contactless activation information KLAI which may be present and therefore produce on their first output terminal 86 contact-bound mode-setting information KBEI=1, which is associated with the contact-bound activation information KBAI, and produce on their second output terminal 87 switching-means closing information SEI=0, which is likewise associated with the contact-bound activation information KBAI. As a result of this, the switching means 91 are set to their low-impedance, turned-on state, upon which the first supply potential VCC is applied to the second electrically conductive potential line 41 via the first electrically conductive potential line 28 and the turned-on switching means 91, which guarantees the potential supply to all the circuit sections of the data carrier 1 and the circuit 1A, and that the data carrier 1 and the circuit 1A are set to the contact-bound mode (CONTACT).

Owing to the provision of the a.c. detection means 69 and the additional provision of the combination detection means 73 the data carrier 1 and the circuit 1A shown in FIG. 1 guarantee a particularly high reliability as regards a correct and substantially interference-immune selection and activation of one of the two modes of operation of the data carrier 1 and the circuit 1A, i.e. either the contact-bound mode or the contactless mode. The provision of the switching means 91 further has the advantage that in the contactless mode the supply potential VDD then generated cannot reach the second transmission contact 17 of the contact array 15. Moreover, the provision of the potential equalizing means 94 in the data carrier 1 guarantees that both the second transmission contact 17 and the fourth transmission contact 19 are at ground potential in the contactless mode of the data carrier 1 and the circuit 1A and these two transmission contacts 17 and 19 therefore have the same potential as the third transmission contact 18 in the contactless mode, which thus precludes problems as a result of potential differences between these contacts in environments with explosion hazard.

The invention is not limited to the two embodiments of the data carrier and its circuit described hereinbefore by way of example. A data carrier in accordance with the invention need not include just one transmission coil but may alternatively include two or more transmission coils. Instead of a latch other memory types can be used as memory means for the cooperation with the combination detection means. Alternatively, the logic means can be constructed so as to give the contactless activation information priority over the contact-bound activation information; in such a case it may then be advantageous that the a.c. detection means cooperate with a latch in which prior contactless activation information can be stored and that by means of such stored prior contactless activation information it is assured that when the contactless mode, which has priority, is active it cannot be disrupted by spurious signals via the transmission contacts. In both data carriers described hereinbefore the a.c. detection means are intended and constructed for the direct detection of a useful HF signal. However, alternatively, a.c. detection means may be provided which can indirectly detect a presence of a useful HF signal, for example in that they are intended and constructed for the detection of the presence a clock signal derived from a useful HF signal by regeneration. In contradistinction to the data carrier shown in FIG. 1 a further data carrier may comprise combination detection means which are intended and constructed only for the detection of the presence of a clock signal applied via a transmission contact and for the detection of the presence of a supply potential applied via as further transmission contact and not for the detection of prior contact-bound activation information, in which case it is not necessary to provide memory means which cooperate with such combination detection means for the storage of contact-bound activation information generated by the combination detection means. In the data carriers described hereinbefore the switching means and the potential equalizing means are both implemented by means of transistor switches; however, these means can alternatively be implemented by diode switches or other electrically controllable switches.

We claim:

1. A data carrier operable in a contact-bound mode and in a contactless mode and which includes the means specified hereinafter, namely a transmission contact and a further transmission contact which are both mechanically accessible from outside the data carrier, and at least one transmission coil which is inductively accessible from outside the data carrier and which serves to receive a useful HF signal in the contactless mode of the data carrier, and a circuit which has a contact terminal connected to the further transmission contact and which includes supply voltage generating means and by which derives a supply voltage for various circuit section of the circuit of the data carrier from an applied useful HF signal, the circuit including a first switch, and of the one contact terminal connected to the one transmission contact and the further contact terminal connected to the further transmission contact at least one of these two contact terminals is connected to the first switch, and the first switch enables the application of a potential, which appears as a result of supply voltage generated by the supply voltage generating means, and to inhibit application of the potential to this at least one contact terminal.

2. A data carrier as claimed in claim 1, characterized in that the first switch comprises at least one transistor switch, and each such transistor switch is arranged in series with an associated contact terminal and switchable between a high-impedance and a low-impedance switching state.

3. A data carrier as claimed in claim 1, characterized in that the one contact terminal connected to the one transmission contact is formed by the contact terminal which is arranged to receive a first supply potential in the contact-bound mode.

4. A data carrier as claimed in claim 1, characterized in that the circuit includes logic means which are arranged to receive contactless activation information, indicating activation of the contactless mode, and contact-bound activation information, indicating activation of the contact-bound mode, and which are of such a construction that they are capable of supplying switching means control information and that when solely the contactless activation information associated with said control information occurs they supply switching-means opening information as switching-means control information, and when solely the contact-bound activation information occurs they supply switching-means closing information associated with said control information as switching-means control information, and when both types of activation information occur simultaneously they give one of said two types of activation information, priority over the other one of said two types of activation information and, consequently, also supply the switching-means control information associated with the activation information having priority, the switching-means opening information enabling the first switch to be set to the switching state in which the application of a potential is inhibited and the switching-means closing information enabling the first switch to be set to their switching state in which the application of a potential is possible.

5. A data carrier as claimed in claim 4, characterized in that the logic means are of such a construction that when at the same time the contactless activation information and the contact-bound activation information occur they give the contact-bound activation information priority over the contactless activation information and they consequently supply the associated switching means opening information as switching means control information.

6. A circuit for a data carrier operable in a contact-bound mode and in a contactless mode and which includes the means specified hereinafter, namely a contact terminal and a further contact terminal which are both adapted to be connected to transmission contacts which are mechanically accessible from outside the data carrier, and two coil terminals which serve for connection to a transmission coil which is inductively accessible from outside a data carrier and which serves to receive a useful HF signal in the contactless mode of the circuit, and supply voltage generating means which derives a supply voltage for various circuit sections of the circuit from an applied useful HF signal, the circuit including switching means, and of the one contact terminal adapted to be connected to the one transmission contact and the further contact terminal adapted to be connected to the further transmission contact at least one of these two contact terminals is connected to the switching means, and the switching means enable the application of a potential, which appears as a result of the supply voltage generated by the supply voltage generating means, to this at least one contact terminal to be inhibited.

7. A circuit as claimed in claim 6, characterized in that the switching means comprise at least one transistor switch, and each such transistor switch is arranged in series with an associated contact terminal and switchable between a high-impedance and a low-impedance switching state.

8. A circuit as claimed in claim 6, characterized in that the one contact terminal adapted to be connected to the one transmission contact is formed by the contact terminal which is arranged to receive a first supply potential in the contact-bound mode.

9. A circuit as claimed in claim 6, characterized in that the circuit includes logic means which are arranged to receive contactless activation information, indicating activation of the contactless mode, and contact-bound activation information, indicating activation of the contact-bound mode, and which are of such a construction that they are capable of supplying switching means control information and that when solely the contactless activation information associated with said control information occurs they supply switching-means opening information as switching-means control information, and when solely the contact-bound activation information occurs they supply switching-means closing information associated with said control information as switching-means control information, and when both types of activation information occur simultaneously they give one of said two types of activation information priority over the other one of said two types of activation information and, consequently, also supply the switching-means control information associated with the activation information having priority, the switching-means opening information enabling the switching means to be set to their switching state in which the application of a potential is inhibited and the switching-means closing information enabling the switching means to be set to their switching state in which the application of a potential is possible.

10. A circuit as claimed in claim 9, characterized in that the logic means are of such a construction that when at the same time the contactless activation information and the contact-bound activation information occur they give the contact-bound activation information priority over the contactless activation information and they consequently supply the associated switching means opening information as switching means control information.

11. A data carrier operable in a contact-bound mode and in a contactless mode and which includes the means specified hereinafter, namely a transmission contact and a further transmission contact which are both mechanically accessible from outside the data carrier, and at least one transmission coil which is inductively accessible from outside the data carrier and which serves to receive a useful HF signal in the contactless mode of the data carrier, and a circuit which has a contact terminal connected to the further transmission contact and which includes supply voltage generating means deriving a supply voltage for various circuit section of the circuit of the data carrier from an applied useful HF signal, the circuit includes a first switch, and of the one contact terminal connected to the one transmission contact and the further contact terminal connected to the further transmission contact at least one of these two contact terminals is connected to the first switch, and the first switch enable the application of a potential, which appears as a result of supply voltage generated by the supply voltage generating means, to this at least one contact terminal to be inhibited; and a second switch connected between the at least one of these to contact terminals and a reference potential, the second switch being closed when the first switch inhibits connection of the supply voltage to the at least one of these to contact terminals.

12. A method for operating a data carrier which can be operated in a contact-bound mode and in a contactless mode, comprising the steps of:

detecting if the presence of an HF signal providing a useful communications channel is present;

detecting if the presence of a useful signal is present at least one contact of the data carrier; and if the presence of a useful HF signal is present, opening a switch connecting an internal voltage supply, the internal voltage supply deriving power from the HF signal, and a voltage contact.

\* \* \* \* \*